US012728681B2

(12) United States Patent
Fowler

(10) Patent No.: US 12,728,681 B2
(45) Date of Patent: Sep. 8, 2026

(54) CONVOLUTE FOR A BELLOWS FOR A GANGWAY, BELLOWS FOR A GANGWAY AND MULTI-CAR VEHICLE

(71) Applicant: DELLNER COUPLERS AB, Falun (SE)

(72) Inventor: Jason Fowler, Allestree (GB)

(73) Assignee: DELLNER COUPLERS AB, Falun (SE)

(*) Notice: Subject to any disclaimer, the term of this patent is extended or adjusted under 35 U.S.C. 154(b) by 735 days.

(21) Appl. No.: 17/924,864

(22) PCT Filed: Mar. 25, 2021

(86) PCT No.: PCT/EP2021/057750
§ 371 (c)(1),
(2) Date: Nov. 11, 2022

(87) PCT Pub. No.: WO2021/228462
PCT Pub. Date: Nov. 18, 2021

(65) Prior Publication Data

US 2023/0191860 A1 Jun. 22, 2023

(30) Foreign Application Priority Data

May 11, 2020 (SE) .................................... 2050549-1

(51) Int. Cl.
*B60D 5/00* (2006.01)
*B61D 17/22* (2006.01)
*B62D 47/02* (2006.01)

(52) U.S. Cl.
CPC ............. *B60D 5/003* (2013.01); *B61D 17/22* (2013.01); *B62D 47/025* (2013.01)

(58) Field of Classification Search
CPC ....... B60D 5/003; B61D 17/22; B62D 47/025
(Continued)

(56) References Cited

U.S. PATENT DOCUMENTS 5,456,186 A 10/1995 Hübner
6,196,132 B1 * 3/2001 Hubner .................. B60D 5/003 105/3

(Continued)

FOREIGN PATENT DOCUMENTS

CN 2561648 Y * 7/2003
CN 105555634 A 5/2016

(Continued)

OTHER PUBLICATIONS

International Search Report and Written Opinion in PCT Application No. PCT/EP2021/057750 mailed on Jun. 29, 2021, 8 pages.

(Continued)

*Primary Examiner* — Valentin Neacsu
*Assistant Examiner* — Mohamed M Medani
(74) *Attorney, Agent, or Firm* — Howard IP Law Group PC

(57) ABSTRACT

The invention relates to a convolute for a bellows for a gangway, the convolute having an outer layer that extends from •a first rim that is either arranged inwardly of further parts of the convolute or is arranged outwardly from further parts of the convolute •via a curved section •to a second rim, that is either arranged inwardly of further parts of the convolute or is arranged outwardly from further parts of the convolute, but is arranged on the same side relative to these further parts of the convolute than the first rim is, the outer layer having an inward facing surface that extends from the first rim via the inward facing surface of the curved section to the second rim, whereby an inner layer that has a first piece and a second piece, whereby •the first piece has a first end that is attached to the outer layer in the region of the first rim and has a second end that is opposite the first end and that is arranged in the region of the inward facing surface of the curved section and •the second piece has a first end that (Continued)

is attached to the outer layer in the region of the second rim and has a second end that is opposite the first end and that is arranged in the region of the inward facing surface of the curved section whereby the second end of the first piece overlaps the second piece in the region of the inward facing surface of the curved section and the second end of the second piece overlaps the first piece in the region of the inward facing surface of the curved section.

15 Claims, 3 Drawing Sheets

(58) Field of Classification Search
USPC .......................................................... 280/403
See application file for complete search history.

(56) References Cited

U.S. PATENT DOCUMENTS

| | | | | |
|---|---|---|---|---|
| 7,866,683 | B2 * | 1/2011 | Browne | B61D 17/22 105/20 |
| 8,733,777 | B2 * | 5/2014 | Junke | B61D 17/22 280/403 |
| 10,086,848 | B2 | 10/2018 | Smith | |
| 10,472,005 | B2 | 11/2019 | Tatzel et al. | |
| 2017/0297638 | A1 | 10/2017 | Tatzel et al. | |

FOREIGN PATENT DOCUMENTS

| | | | | |
|---|---|---|---|---|
| CN | 209366152 | U | 9/2019 | |
| CN | 111132888 | A | 5/2020 | |
| DE | 8014005 | U1 | 10/1980 | |
| DE | 4127535 | A1 | 2/1993 | |
| DE | 4322098 | A1 | 1/1995 | |
| DE | 19721285 | A1 * | 11/1998 | B60D 5/003 |
| DE | 202016001988 | U1 | 7/2016 | |
| EP | 1995086 | A1 | 11/2008 | |
| EP | 2468600 | A1 | 6/2012 | |
| EP | 2810845 | A1 | 12/2014 | |
| EP | B235666 | A1 | 10/2017 | |
| EP | 3666618 | A1 | 6/2020 | |
| EP | 3666618 | B1 * | 5/2023 | B60D 5/003 |
| GB | 2337239 | A | 11/1999 | |
| GB | 2363106 | A | 8/2000 | |
| JP | H0624335 | A | 2/1994 | |
| JP | 2011152890 | A | 8/2011 | |
| NL | 7513398 | A | 6/1976 | |
| WO | 2019225971 | A1 | 11/2019 | |

OTHER PUBLICATIONS

Search Report in SE Application No. 2050549-1 mailed on Dec. 7, 2020, 3 pages.
Search Opinion in SE Application No. 2050549-1 mailed on Dec. 7, 2020, 6 pages.

* cited by examiner

Fig. 5
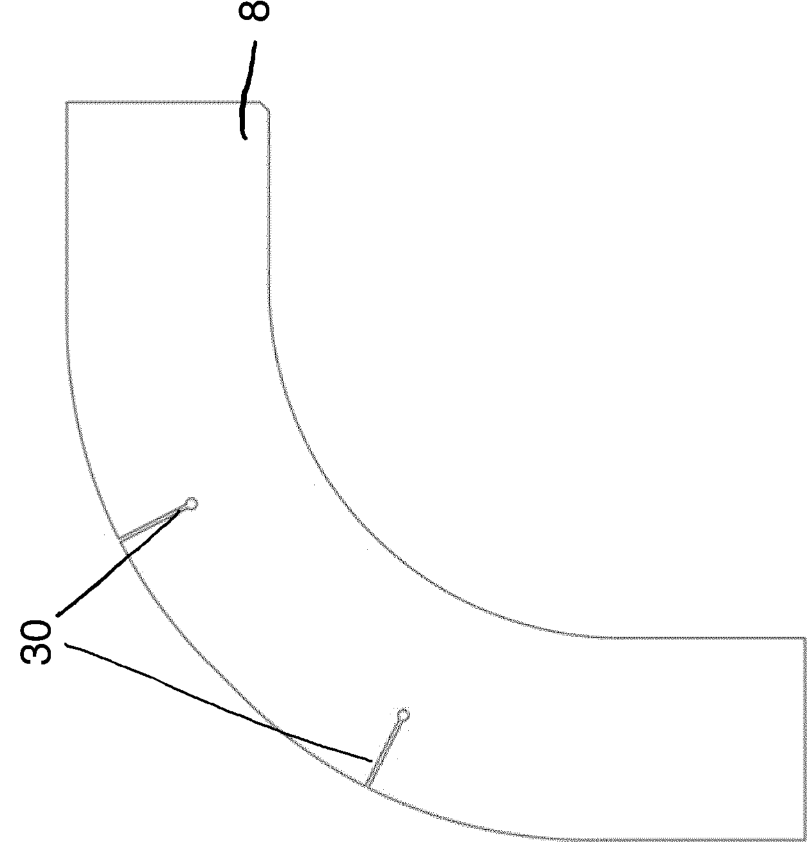
8
30

CONVOLUTE FOR A BELLOWS FOR A GANGWAY, BELLOWS FOR A GANGWAY AND MULTI-CAR VEHICLE

CROSS-REFERENCE TO RELATED APPLICATIONS

This application is the national stage application under 35 U.S.C. § 371 of International Application No. PCT/EP2021/057750 filed on Mar. 25, 2021, which claims priority to SE 2050549-1 filed on May 11, 2020, the entire disclosures of which are incorporated herein by reference in their entireties.

FIELD OF INVENTION

The invention relates to a convolute for a bellows for a gangway. The invention also relates to a bellows for a gangway and also relates to a multi-car vehicle.

BACKGROUND

Gangways are known from everyday life. They provide a means for passengers to move from one enclosure, for example a room of a building or a car of a multi-car vehicle, to a second enclosure, for example a room of a different building or a vehicle or a second car of a multi-car vehicle, by means of such a gangway that is connected to the one enclosure on the one end and the second enclosure at the second end. In multi-car vehicles, like trains or articulated buses, gangways are arranged between a first car and a second car of these types of multi-car vehicles. Gangways are, for example, also used at airports, where they connect the airport building with the plane. Designs are also known, where two gangways are connected to one another. Certain train types have a first car that at one of its ends has a first gangway connected to it. The first end of the first gangway is connected to the first car. These types of trains have a second car with a second gangway attached to it. The first end of the second gangway is attached to the second car. In these types of trains, the second end of the first gangway and the second end of the second gangway are connected to each other, thereby connecting the first gangway to the second gangway in order to provide means for the passengers to safely cross from the first car to the second car.

While gangways are known that have sidewalls that can move relative to each other in a telescopic manner, one frequent type of gangway is a gangway that comprises a bellows and an endframe. The invention relates to this subtype of a gangway. The endframe of such a gangway is used to attach the gangway to the neighbouring object, for example the car. The bellows is used to create a tunnel, through which the passengers can pass. The bellows typically is made up of a series of convolutes, whereby the respective convolute has a horseshoe-shape. The gangway might have an outer bellows. An outer bellows is understood to be a bellows, whereby the individual convolutes of the bellows open towards the inside of the gangway while the rounded bottoms of the individual convolutes are arranged further outward. The gangway might have an inner bellows. An inner bellows is understood to be a bellows, whereby the individual convolutes of the bellows open towards the outside of the gangway while the rounded bottoms of the individual convolutes are arranged further inward. The gangway might even have outer bellows and inner bellows.

From U.S. Pat. No. 5,456,186 a multi-car vehicle (FIG. 1) is known that has a bellows (FIG. 4) that is made up of several convolutes. The respective convolute for the bellows for the gangway has an outer layer (reference sign (22) in FIG. 5) that extends from a first rim (for example the rim held in the clamping profile section or frame (19) in FIG. 5) that is arranged inwardly of further parts of said convolute, whereby this outer layer extends from the first rim via a curved section to a second rim (for example the rim that is held in the next clamping profile section or frame that is arranged next to the clamping profile section or frame 19 as designated in FIG. 5). The outer layer has an inward facing surface that extends from the first rim via the inward facing surface of the curved section to the second rim. The convolute known from U.S. Pat. No. 5,456,186 has an inner layer (designated by the arrows (21) in FIG. 5). Like the outer layer (22), the inner layer (21) extends from a first rim via a curved section to a second rim. As described in U.S. Pat. No. 5,456,186 in the area of each groove or semicircular wave of the actual bellows wall, the groove or semicircular wave (22) of the outer wall is held at a predetermined distance from the material strips of the inner wall by means of the webs (23), which are spaced from the apex of each of the sides, until both bellows strips approaching one another towards the edges, where they finally overlap in the area of the edges. With the two edges overlapping, both bellows wall edges are then securely held in a common clamping profile section of frame (19, 24, 25). U.S. Pat. No. 5,456,186 describes the design of these convolutes to be available in the area of the bellows side wall (8, 9 in FIG. 2) U.S. Pat. No. 5,456,186 teaches that in the area of the bellows top (10), the bellows bottom (11) and the transition areas (12 to 15), the bellows has the contour of grooves as shown in FIG. 6, namely is of a single layer. U.S. Pat. No. 5,456,186 teaches that FIG. 5 shows a bellow wall cross-section in the area of the bellows side walls (8, 9), while FIG. 6 shows a corresponding bellows for a cross-section in the area of the bellows top, the bellows bottom (11) and the transition area (12 to 15).

The design known from U.S. Pat. No. 5,456,186 is known to make the bellows stiffer in portions of the bellows (the sidewalls), where this stiffening possibly is unwanted. Furthermore, the design chosen by U.S. Pat. No. 5,456,186 with the double layout walls, whereby the individual layers of the walls are interconnected by ways of webs, has proven to be difficult to manufacture.

SUMMARY

Given this background, the problem to be solved by the invention is to suggest a convolute for a bellows for a gangway that can be manufactured more easily and/or provides a bellows that has a better flexibility.

This problem is solved by the convolute for a bellows for a gangway, and the bellows for a gangway, and the multi-car vehicle according to the present disclosure.

The invention is based on the basic concept to do away with the inner layer as taught by U.S. Pat. No. 5,456,186 and to provide a differently designed inner layer, namely an inner layer that has a first piece and a second piece, whereby the first piece has a first end that is attached to the outer layer in the region of the first rim and has a second end that is opposite the first end and that is arranged in the region of the inward facing surface of the curved section and the second piece has a first end that is attached to the outer layer in the region of the second rim and has a second end that is opposite the first end and that is arranged in the region of the inward facing surface of the curved section, whereby the second end of the first piece overlaps the second piece in the region of the inward facing surface of the curved section and the second end of the second piece overlaps the first piece in the region of the inward facing surface of the curved section.

Making the second end of the first piece overlap the second piece in the region of the inward facing surface of the curved section and the second end of the second piece overlap the first piece in the region of the inward facing surface of the curved section allows for a better flexibility. With the first piece and the second piece not being connected to each other, but being able to slide relative to each other in the area, where their ends overlap, the convolute becomes more flexible in comparison to the design known from U.S. Pat. No. 5,456,186. Where in the design of U.S. Pat. No. 5,456,186 the continuous inner wall has a certain stiffness that acts against certain movement of the bellows (like for example the squeezing together of the convolute or shearing movements of the convolutes), the different technology applied by the invention, namely to have the inner layer consist of a first piece and a second piece that overlap each other provides for a greater freedom of movement. Furthermore, the inner layer according to the invention can be installed more easily, as there is no necessity to connect the inner layer with the outer layer by way of webs as has been suggested in U.S. Pat. No. 5,456,186.

The invention is directed to a convolute for a bellows for a gangway. The advantages of the invention can already be achieved by designing the individual convolute of a gangway in the specific manner described by the invention. The invention can also be implemented by way of retrofitting existing convolutes of gangways, namely gangways that have a single layer. In this retrofit, the existing layer of the convolute would be used as outer layer according to the invention and the inner layer as taught by the invention would be additionally introduced and affixed to the outer layer in the manner described in the invention.

The convolute according to the invention has an outer layer. The outer layer extends from a first rim via a curved section to a second rim.

The first rim and/or the second rim in a preferred embodiment have a linear section.

The first rim can be made up of

- a first linear section in the area of a longitudinal first side piece of the convolute
- a second linear section in the area of a longitudinal top piece of the convolute
- a third linear section in the area of a longitudinal second side piece of the convolute
- a first corner section in the area of a first corner piece of the convolute that connects the first side piece of the convolute to the top piece of the convolute
- a first corner section in the area of a second corner piece of the convolute that connects the top piece of the convolute to the second side piece of the convolute.

The first rim additionally can have

- a fourth linear section in the area of a longitudinal bottom piece of the convolute
- a third corner section in the area of a third corner piece of the convolute that connects the first side piece of the convolute to the bottom piece of the convolute
- a fourth corner section in the area of a fourth corner piece of the convolute that connects the bottom piece of the convolute to the second side piece of the convolute.

The second rim can be made up of

- a first linear section in the area of a longitudinal first side piece of the convolute
- a second linear section in the area of a longitudinal top piece of the convolute

- a third linear section in the area of a longitudinal second side piece of the convolute
- a first corner section in the area of a first corner piece of the convolute that connects the first side piece of the convolute to the top piece of the convolute
- a first corner section in the area of a second corner piece of the convolute that connects the top piece of the convolute to the second side piece of the convolute.

The second rim additionally can have

- a fourth linear section in the area of a longitudinal bottom piece of the convolute
- a third corner section in the area of a third corner piece of the convolute that connects the first side piece of the convolute to the bottom piece of the convolute
- a fourth corner section in the area of a fourth corner piece of the convolute that connects the bottom piece of the convolute to the second side piece of the convolute.

The convolute according to the invention is directed to those convolutes, which extend from the first rim via a curved section to a second rim. Such embodiments are shown in FIGS. 5 and 6 of U.S. Pat. No. 5,456,186. Like these embodiments, the cross-section of the convolute according to the invention can be horse-shoe-shaped, which could also be called u-shaped. Different designs of convolutes according to the invention can be implemented, where the curved section of the convolute has a V-shape. Such a convolute is shown for example in FIG. 4 of U.S. Pat. No. 5,456,186, whereby a convolute is made up of a first plane stripe 4*a* and a second plane stripe (4*b*) that are interconnected to each other by a crimping frame 17.

The convolute might be designed for an outer bellows of a gangway. An outer bellows is understood to be a bellows, whereby the individual convolutes of the bellows open towards the inside of the gangway while the rounded bottoms of the individual convolutes are arranged further outward. The convolutes for such an outer bellows have a first rim that is arranged inwardly of further parts of the convolute, for example inwardly of the rounded bottoms of the individual convolutes that are arranged further outward in this type of bellows. The convolutes for such an outer bellows have a second rim that is arranged inwardly of further parts of the convolute, for example inwardly of the rounded bottoms of the individual convolutes that are arranged further outward in this type of bellows.

The convolute might be designed for an inner bellows of a gangway. An inner bellows is understood to be a bellows, whereby the individual convolutes of the bellows open towards the outside of the gangway while the rounded bottoms of the individual convolutes are arranged further inward. The convolutes for such an outer bellows have a first rim that is arranged outwardly of further parts of the convolute, for example outwardly of the rounded bottoms of the individual convolutes that are arranged further inward in this type of bellows. The convolutes for such an outer bellows have a second rim that is arranged outwardly of further parts of the convolute, for example outwardly of the rounded bottoms of the individual convolutes that are arranged further inward in this type of bellows.

According to the invention, the outer layer has a inward facing surface that extends from the first rim via the inward facing surface of the curved section to the second rim.

According to the invention an inner layer is provided that has a first piece and a second piece. The first piece has a first end that is attached to the outer layer in the region of the first rim. The first rim is understood to be the final edge of the convolute. The term "in the region of the first rim" is understood to include everything that lies between the first rim (the final edge) and an imaginary line that runs parallel to the first rim and is displaced from the first rim along the inward facing surface of the outer layer by 20% of the length of the inward facing surface of the outer layer, whereby the length of the inward facing surface of the outer layer is the distance along the inward facing surface of the outer layer from the first rim to the second rim. For example, if the length of the inward facing surface of the outer layer is 200 mm, the "region of the first rim" is considered to be everything that is between the first rim and an imaginary line that runs parallel to the first rim and is displaced from the first rim by 40 mm (20% of 200 mm) along the inward facing surface of the outer layer. Preferably, the term "in the region of the first rim" is understood to include everything that lies between the first rim (the final edge) and an imaginary line that runs parallel to the first rim and is displaced from the rim along the inward facing surface of the outer layer by 15%, preferably by 10% of the length of the inward facing surface of the outer layer.

The first piece of the inner layer also has a second end that is opposite the first end and that is arranged in the region of the inward facing surface of the curved section.

The inner layer also has a second piece that has a first end that is attached to the outer layer in the region of the second rim. The second rim is understood to be the final edge of the convolute. The term "in the region of the second rim" is understood to include everything that lies between the second rim (the final edge) and an imaginary line that runs parallel to the second rim and is displaced from the second rim along the inward facing surface of the outer layer by 20% of the length of the inward facing surface of the outer layer, whereby the length of the inward facing surface of the outer layer is the distance along the inward facing surface of the outer layer from the first rim to the second rim. For example, if the length of the inward facing surface of the outer layer is 500 mm, the "region of the second rim" is considered to be everything that is between the second rim and an imaginary line that runs parallel to the rim and is displaced from the rim by 100 mm (20% of 500 mm) along the inward facing surface of the outer layer. Preferably, the term "in the region of the second rim" is understood to include everything that lies between the second rim (the final edge) and an imaginary line that runs parallel to the second rim and is displaced from the second rim along the inward facing surface of the outer layer by 15%, preferably by 10% of the length of the inward facing surface of the outer layer.

The second piece of the inner layer also has a second end that is opposite the first end and that is arranged in the region of the inward facing surface of the curved section.

The first end of the first piece might be designed to end, where the first piece is attached to the outer layer. However, designs are also feasible for the invention, where the first end of the first piece extends from where the first piece is attached to the outer layer further towards the first rim and in a preferred embodiment all the way to the first rim. The first end of the second piece might be designed to end, where the second piece is attached to the outer layer. However, designs are also feasible for the invention, where the first end of the second piece extends from where the second piece is attached to the outer layer further towards the second rim and in a preferred embodiment all the way to the second rim.

According to the invention the second end of the first piece overlaps the second piece in the region of the inward facing surface of the curved section and the second end of the second piece overlaps the first piece in the region of the inward facing surface of the curved section. Having the first end of the first piece overlap the second piece and the second end of the second piece overlap the first piece allows a relative movement between the second end of the first piece and the second piece and also allows relative movement between the second end of the second piece and the first piece. This movement helps to enhance the flexibility of the convolute.

In a preferred embodiment, the inward facing surface of the curved section has a crest. The inward facing surface of the curved section can for example have a shape of its cross-section that is a semicircle, with the one end of the semicircle been the first rim and the other end of the semicircle being the second rim. In such a design, the crest would be the topmost part of the semicircular shaped inward facing surface of the curved section. Different shapes of the inward facing the surface of the curved section are also feasible, for example they can have the shape of half of an ellipse or a u-shape.

According to the preferred embodiment, the second end of the first piece is an edge of the first piece that extends parallel to the crest. In an alternative or in addition the second end of the second piece can be an edge of the second piece that extends parallel to the crest. Designs are feasible, where the second end of the first piece and/or the second end of the second piece do not extend parallel to the crest. The second end of the first piece and/or the second end of the second piece can for example be V-shaped or can ran at an angle to the crest. Such angular or V-shaped designs of the second end of the first piece and/or the second of the second piece can be used to obtain certain restoring forces or other technical effects. It is believed, however, that making the second end of the first piece as an edge of the first piece that extends parallel to the crest and the second end of the second piece as an edge of the second piece that extends parallel to the crest allows good symmetry of the convolute and allows for symmetrical restoring forces of the convolute into a predefined normal position.

In a preferred embodiment the second end of the first piece is independent from the second piece, especially independent from the second end of the second piece. In a preferred embodiment there is no additional layer of material that is connected to the second end of the first piece and connected to the second piece, especially the second end of the second piece. Such an additional layer of material would make the second end of the first piece, especially the way the second end of the first pieces moves, at least to a certain extend dependent from the second piece, especially movements of the second piece. According to the preferred embodiment, such a dependency is avoided.

In a preferred embodiment the second end of the second piece is independent from the first piece, especially independent from the second end of the first piece. In a preferred embodiment there is no additional layer of material that is connected to the second end of the second piece and connected to the first piece, especially the second end of the first piece. Such an additional layer of material would make the second end of the second piece, especially the way the second end of the first pieces moves, at least to a certain extend dependent from the first piece, especially movements of the first piece. According to the preferred embodiment, such a dependency is avoided.

In a preferred embodiment the first piece is independent from the second piece. In a preferred embodiment there is no additional layer of material that is connected to the first piece and connected to the second piece, but the outer layer. Such an additional layer of material would make the first piece, especially the way the first pieces moves, at least to a certain extend dependent from the second piece, especially movements of the second piece. According to the preferred embodiment, such a dependency is avoided.

In a preferred embodiment, the first piece is unpadded. Adding a padding to the first piece—which might otherwise seem useful for purposes of insolation or noise reduction—can have an influence on the way the first piece moves, especially can reduce the flexibility of the first piece.

In a preferred embodiment, the second piece is unpadded. Adding a padding to the second piece—which might otherwise seem useful for purposes of insolation or noise reduction—can have an influence on the way the first piece moves, especially can reduce the flexibility of the first piece.

In a preferred embodiment the second end of the first piece is a free edge of the first piece. In a preferred embodiment no crimps are arranged at the second end of the first piece. Crimps can negatively influence the freedom of the second end of the first piece to move or flex.

In a preferred embodiment the second end of the second piece is a free edge of the first piece. In a preferred embodiment no crimps are arranged at the second end of the first piece. Crimps can negatively influence the freedom of the second end of the first piece to move or flex.

In a preferred embodiment the first piece has a cut or has several cuts that extend from the second end into the material of the first piece. In addition or as an alternative the second piece has one cut or has several cuts that extend from the second end into the material of the second piece. These cuts can be used to allow the material of the inner layer to overlap itself. Such design features might be necessary in areas where the convolute extends around a corner, for example the part of the convolute that connects the top part of a convolute (that might be a linear part) to a side part of a convolute (that might also be a linear part of the convolute).

In a preferred embodiment, the outer layer is made from a different material than the material that the inner layer is made off. Designs are feasible, where the outer layer and the inner layer are made up from the same material. In such designs, providing the inner layer simply doubles some characteristics that are obtained by the outer layer. Making the inner layer from a different material than the outer layer is made of, however, allows for the possibility to achieve different characteristics by way of providing the inner layer in comparison to the characteristics obtained by the outer layer. The material of the outer layer can, for example, be chosen with a particular eye on water tightness, while the material of the inner layer can, for example, be chosen with a particular eye on noise or thermal insulation. In a preferred embodiment, the outer layer is made of a mixture of silicon and fabric layers, normally 3 or 5 plys (layers). In a preferred embodiment, the outer layer is made of a fabric polymer composite or a polymer composite or fabric composite. In a preferred embodiment, the first piece and the second piece of the inner layer are made of a mixture of silicon and fabric layers, normally 3 or 5 plys (layers). In a preferred embodiment the first piece and the second piece of the inner layer are made of a fabric polymer composite or a polymer composite or fabric composite.

In a preferred embodiment, the outer layer has

- a longitudinal first side piece
- a longitudinal top piece
- a longitudinal second side piece
- a first corner piece that connects the first side piece to the top piece
- a second corner piece that connects the top piece to the second side piece.

The outer layer may also have

- a longitudinal bottom piece
- a third corner piece that connects the first side piece to the bottom piece
- a fourth corner piece that connects the bottom piece to the second side piece.

In a preferred embodiment, the inner layer is arranged inside the first side piece and/or inside the top piece and/or inside the second side piece and/or inside the first corner piece and/or inside the second corner piece.

In a preferred embodiment, the inner layer is arranged inside one of the elements of the group of elements that contains the first side piece, the top piece, the second side piece, the first corner piece and the second corner piece. In a preferred embodiment, the inner layer is arranged only inside one of the elements of the group of elements that contains the first side piece, the top piece, the second side piece, the first corner piece and the second corner piece. In a preferred embodiment, the inner layer is arranged inside two of the elements of the group of elements that contains the first side piece, the top piece, the second side piece, the first corner piece and the second corner piece. In a preferred embodiment, the inner layer is arranged only inside two of the elements of the group of elements that contains the first side piece, the top piece, the second side piece, the first corner piece and the second corner piece. In a preferred embodiment, the inner layer is arranged inside three of the elements of the group of elements that contains the first side piece, the top piece, the second side piece, the first corner piece and the second corner piece. In a preferred embodiment, the inner layer is arranged only inside three of the elements of the group of elements that contains the first side piece, the top piece, the second side piece, the first corner piece and the second corner piece. In a preferred embodiment, the inner layer is arranged inside four of the elements of the group of elements that contains the first side piece, the top piece, the second side piece, the first corner piece and the second corner piece. In a preferred embodiment, the inner layer is arranged only inside four of the elements of the group of elements that contains the first side piece, the top piece, the second side piece, the first corner piece and the second corner piece. In a preferred embodiment, the inner layer is arranged inside all of the elements of the group of elements that contains the first side piece, the top piece, the second side piece, the first corner piece and the second corner piece.

In a preferred embodiment, the inner layer is arranged inside one of the elements of the group of elements that contains the first side piece, the top piece, the second side piece, the first corner piece, the second corner piece, the bottom piece, the third corner piece and the fourth corner piece. In a preferred embodiment, the inner layer is arranged only inside one of the elements of the group of elements that contains the first side piece, the top piece, the second side piece, the first corner piece, the second corner piece, the bottom piece, the third corner piece and the fourth corner piece. In a preferred embodiment, the inner layer is arranged inside two of the elements of the group of elements that contains the first side piece, the top piece, the second side piece, the first corner piece, the second corner piece, the bottom piece, the third corner piece and the fourth corner piece. In a preferred embodiment, the inner layer is arranged only inside two of the elements of the group of elements that contains the first side piece, the top piece, the second side piece, the first corner piece, the second corner piece, the bottom piece, the third corner piece and the fourth corner piece. In a preferred embodiment, the inner layer is arranged inside three of the elements of the group of elements that contains the first side piece, the top piece, the second side piece, the first corner piece, the second corner piece, the bottom piece, the third corner piece and the fourth corner piece. In a preferred embodiment, the inner layer is arranged only inside three of the elements of the group of elements that contains the first side piece, the top piece, the second side piece, the first corner piece, the second corner piece, the bottom piece, the third corner piece and the fourth corner piece. In a preferred embodiment, the inner layer is arranged inside four of the elements of the group of elements that contains the first side piece, the top piece, the second side piece, the first corner piece, the second corner piece, the bottom piece, the third corner piece and the fourth corner piece. In a preferred embodiment, the inner layer is arranged only inside four of the elements of the group of elements that contains the first side piece, the top piece, the second side piece, the first corner piece, the second corner piece, the bottom piece, the third corner piece and the fourth corner piece. In a preferred embodiment, the inner layer is arranged inside five of the elements of the group of elements that contains the first side piece, the top piece, the second side piece, the first corner piece, the second corner piece, the bottom piece, the third corner piece and the fourth corner piece. In a preferred embodiment, the inner layer is arranged only inside five of the elements of the group of elements that contains the first side piece, the top piece, the second side piece, the first corner piece, the second corner piece, the bottom piece, the third corner piece and the fourth corner piece. In a preferred embodiment, the inner layer is arranged inside six of the elements of the group of elements that contains the first side piece, the top piece, the second side piece, the first corner piece, the second corner piece, the bottom piece, the third corner piece and the fourth corner piece. In a preferred embodiment, the inner layer is arranged only inside six of the elements of the group of elements that contains the first side piece, the top piece, the second side piece, the first corner piece, the second corner piece, the bottom piece, the third corner piece and the fourth corner piece. In a preferred embodiment, the inner layer is arranged inside seven of the elements of the group of elements that contains the first side piece, the top piece, the second side piece, the first corner piece, the second corner piece, the bottom piece, the third corner piece and the fourth corner piece. In a preferred embodiment, the inner layer is arranged only inside seven of the elements of the group of elements that contains the first side piece, the top piece, the second side piece, the first corner piece, the second corner piece, the bottom piece, the third corner piece and the fourth corner piece. In a preferred embodiment, the inner layer is arranged inside all of the elements of the group of elements that contains the first side piece, the top piece, the second side piece, the first corner piece, the second corner piece, the bottom piece, the third corner piece and the fourth corner piece.

In a preferred embodiment, the inner layer is arranged inside the first side piece and/or the second side piece. In a preferred embodiment, the inner layer is arranged only inside the first side piece and the second corner piece.

In a preferred embodiment, the inner layer is arranged inside two or more of the elements of the group of elements that contains the first side piece, the top piece, the second side piece, the first corner piece and the second corner piece, and has one single first piece that is arranged inside all those pieces of the convolute that the inner layer is arranged in and has one single second piece that is arranged inside all those pieces of the convolute that the inner layer is arranged in. In this embodiment, although the inner layer is arranged inside two or more of the elements of the group of elements that contains the first side piece, the top piece, the second side piece, the first corner piece and the second corner piece, the inner layer only has one first piece and one second piece.

In a preferred embodiment, the inner layer is arranged inside two or more of the elements of the group of elements that contains the first side piece, the top piece, the second side piece, the first corner piece, the second corner piece the bottom piece, the third corner piece and the fourth corner piece, and has one single first piece that is arranged inside all those pieces of the convolute that the inner layer is arranged in and has one single second piece that is arranged inside all those pieces of the convolute that the inner layer is arranged in. In this embodiment, although the inner layer is arranged inside two or more of the elements of the group of elements that contains the first side piece, the top piece, the second side piece, the first corner piece, the second corner piece, the bottom piece, the third corner piece and the fourth corner piece, the inner layer only has one first piece and one second piece.

In a preferred embodiment, the inner layer is arranged inside two or more of the elements of the group of elements that contains the first side piece, the top piece, the second side piece, the first corner piece and the second corner piece, and has a first piece that is made up of several sections, whereby in each piece of the convolute that the inner layer is arranged in, one section of the first piece is arranged. In a preferred embodiment, the individual sections of the first piece are not connected to each other.

In a preferred embodiment, the inner layer is arranged inside two or more of the elements of the group of elements that contains the first side piece, the top piece, the second side piece, the first corner piece, the second corner piece the bottom piece, the third corner piece and the fourth corner piece, and has a first piece that is made up of several sections, whereby in each piece of the convolute that the inner layer is arranged in, one section of the first piece is arranged. In a preferred embodiment, the individual sections of the first piece are not connected to each other.

In a preferred embodiment the inner layer is made up of at least a first inner layer section and a second inner layer section, whereby

- the first piece has a first section that forms part of the first inner layer section
- the first piece has a second section that forms part of the second inner layer
- the second piece has a first section that forms part of the first inner layer section
- the second piece has a second section that forms part of the second inner layer section whereby the first section of the first piece is not connected to the second section of the first piece and/or the first section of the second piece is not connected to the second section of the second piece.

In a preferred embodiment, the inner layer is arranged inside one the elements of the group of elements that contains the first side piece, the top piece, the second side piece, the first corner piece, the second corner piece, the bottom piece, the third corner piece and the fourth corner piece, and has a first piece that extends along the complete length of the element that the inner layer is arranged in and has a second piece that extends along the complete length of the element that the inner layer is arranged in.

In an alternative embodiment the inner layer is arranged inside one the elements of the group of elements that contains the first side piece, the top piece, the second side piece, the first corner piece, the second corner piece, the bottom piece, the third corner piece and the fourth corner piece, and has a first piece that extends only along a portion, for example only along 75% or less, more preferably only along 50% or less, more preferably only 25% or less of the complete length of the element that the inner layer is arranged in and has a second piece that extends only along a portion, for example only along 75% or less, more preferably only along 50% or less, more preferably only 25% or less of the complete length of the element that the inner layer is arranged in. In an even more preferred embodiment, the convolute of this embodiment has an additional layer that is arranged at least partially in that part of the element, into which the first piece and the second piece do not extend, the additional layer being a conventional inner layer that has a first end being connected to the outer layer in the region of the first rim and has a second end being connected to the outer layer in the region of the second rim.

According to the invention, the first piece has a first end that is attached to the outer layer in the region of the first rim. The attachment of the first piece to the outer layer can be obtained by way of glueing, welding or for example a Velcro-connection. The attachment can also be obtained by screws, rivets, bolts, staples, tacking, sewing, crimping or a cable tie. In a preferred embodiment, in the bellows of the invention screws, rivets, bolts, staples, a tacking or sewing is used to connect one convolute of the bellows to a neighbouring convolute and the screws, rivets, bolts, staples, a tacking or sewing at the same time is used to attach the first end of the first piece to the outer layer in the region of the first rim.

In a preferred embodiment, the first piece is attached to the outer layer only at its first end and/or only in the region of the first rim.

According to the invention, the second piece has a first end that is attached to the outer layer in the region of the second rim. The attachment of the second piece to the outer layer can be obtained by way of glueing, welding or for example a Velcro-connection. The attachment can also be obtained by screws, rivets, bolts, staples, tacking, sewing, crimping or a cable tie. In a preferred embodiment, in the bellows of the invention screws, rivets, bolts, staples, a tacking or sewing is used to connect one convolute of the bellows to a neighbouring convolute and the screws, rivets, bolts, staples, a tacking or sewing at the same time is used to attach the first end of the second piece to the outer layer in the region of the second rim.

In a preferred embodiment, the second piece is attached to the outer layer only at its first end and/or only in the region of the first rim.

In a preferred embodiment, the outer layer has

- a longitudinal first side piece
- a longitudinal top piece
- a longitudinal second side piece
- a first corner piece that connects the first side piece to the top piece
- a second corner piece that connects the top piece to the second side piece whereby the convolute has a normal position, whereby in the normal position the section of the first rim that belongs to one piece of the convolute is arranged in the same plane as the section of the second rim that belongs to the same piece of the convolute. In a preferred embodiment, the section of the first rim that belongs to the first side piece in the normal position of the convolute is arranged in the same plane than the section of the second rim that belongs to the first side piece. In a preferred embodiment, the section of the first rim that belongs to the second side piece in the normal position of the convolute is arranged in the same plane than the section of the second rim that belongs to the second side piece. Even more preferred, the section of the first rim that belongs to the first side piece in the normal position of the convolute is arranged in the same plane than the section of the second rim that belongs to the first side piece, which plane in the normal position is parallel to the plane that the section of the first rim that belongs to the second side piece and the section of the second rim that belongs to the second side piece are arranged in. In a preferred embodiment, the section of the first rim that belongs to the top piece in the normal position of the convolute is arranged in the same plane than the section of the second rim that belongs to the top piece. In a preferred embodiment, the convolute has a bottom piece and the section of the first rim that belongs to the bottom piece in the normal position of the convolute is arranged in the same plane than the section of the second rim that belongs to the bottom piece. Even more preferred, the section of the first rim that belongs to the top piece in the normal position of the convolute is arranged in the same plane than the section of the second rim that belongs to the top piece, which plane in the normal position is parallel to the plane that the section of the first rim that belongs to the bottom piece and the section of the second rim that belongs to the bottom piece are arranged in. Even more preferred, the section of the first rim that belongs to the top piece in the normal position of the convolute is arranged in the same plane than the section of the second rim that belongs to the top piece, which plane in the normal position is parallel to the plane that the section of the first rim that belongs to the bottom piece and the section of the second rim that belongs to the bottom piece are arranged in and which plane in the normal position is perpendicular to the plane that the section of the first rim that belongs to the second side piece and the section of the second rim that belongs to the second side piece are arranged in and/or is perpendicular to the plane that the section of the first rim that belongs to the first side piece and the section of the second rim that belongs to the first side piece are arranged in.

The bellows according to the invention is characterised by at least two convolutes according to the invention. In a preferred embodiment, the two convolutes according to the invention are arranged one next to the other and in a preferred embodiment are attached to each other. In a preferred embodiment, one convolute is connected to a neighbouring convolute by way of glueing, welding or for example a Velcro-connection or by way of screws, rivets, bolts, staples, tacking, sewing, clamping or by way of crimping frames, like they are shown in FIG. 5 U.S. Pat. No. 5,456,186 (clamping profile section 19 in U.S. Pat. No. 5,456,186).

In a preferred embodiment, the bellows has 3 to 20, preferably 3 to 15, preferably 6 to 10 convolutes.

The bellows is used to create a tunnel, through which the passengers can pass. The bellows in a preferred embodiment is made up of a series of convolutes, whereby the respective convolute has cross-section that has a horseshoe-, U- or V-shape. The gangway might have an outwardly facing bellows. An outwardly facing bellows is understood to be a bellows, whereby the individual convolutes of the bellows open towards the inside of the gangway while the bottoms of the individual convolutes are arranged further outward. The gangway might have an inwardly facing bellows. An inwardly facing bellows is understood to be a bellows, whereby the individual convolutes of the bellows open towards the outside of the gangway while the bottoms of the individual convolutes are arranged further inward. The gangway might even have outwardly facing bellows and an inwardly facing bellows.

In a preferred embodiment, the bellows according to the invention has a first convolute according to the invention that is arranged next to a second convolute according to the invention, whereby the first rim of the first convolute is connected to the second rim of the second convolute.

In a preferred embodiment, the first end of the first piece of the inner layer of the first convolute is connected to the first rim by the same connection that connects the first rim of the first convolute to the second rim of the second convolute. In an addition, the first end of the second piece of the inner layer of the second convolute is connected to the second rim of the second convolute by the same connection that connects the first rim of the first convolute to the second rim of the second convolute.

The invention is also directed to a multi-car vehicle that has a gangway according to the invention. The multi-car vehicle might have one (single) gangway. In such a design, the gangway would be connected to one car of the multi-car vehicle at one end and would be connected to a second car of the multi-car vehicle at its other end. Most preferably, such a gangway has an endframe according to the invention at each of its ends, hence allowing the advantages of the endframe according to the invention to be realized at each connection to the respective car. A multi-car vehicle might also have a large gangway, which is made up of at least two gangways according to the invention as described above; this arrangement often been called “a gangway made up of two halves”.

The multi-car vehicle according to the invention has a first car connected to a second car, whereby a bellows according to the invention is arranged between the first car and the second car. The multi-car vehicle according to the invention can be a train or can be a tram or can be an articulated bus. The gangway according to the invention can be used in such multi-car vehicles. The gangway according to the invention can, however, also be used to bridge the gap between a building and a vehicle, whereby the vehicle most preferably is a plane.

Wherever in this description a c-shape or a u-shape are being mentioned, the c-shape is used to highlight that the cross-sectional area can be generally curved, while u-shape is used to indicate that at least the sides of the cross-sectional shape can be straight lines, whereby a u-shape would also include cross-sectional designs with two straight sides that are connected to the respective ends of a straight bottom, the angle between the sides in the bottom most preferably being 90°.

BRIEF DESCRIPTION OF DRAWINGS

Below the invention will be described with reference to Figures that only show exemplary embodiments of the invention. In the Figures the following is shown:

FIG. 5: a schematic side view onto a first piece that has cuts that extend from the second end into the material of the first piece.

DETAILED DESCRIPTION

Figure 1:
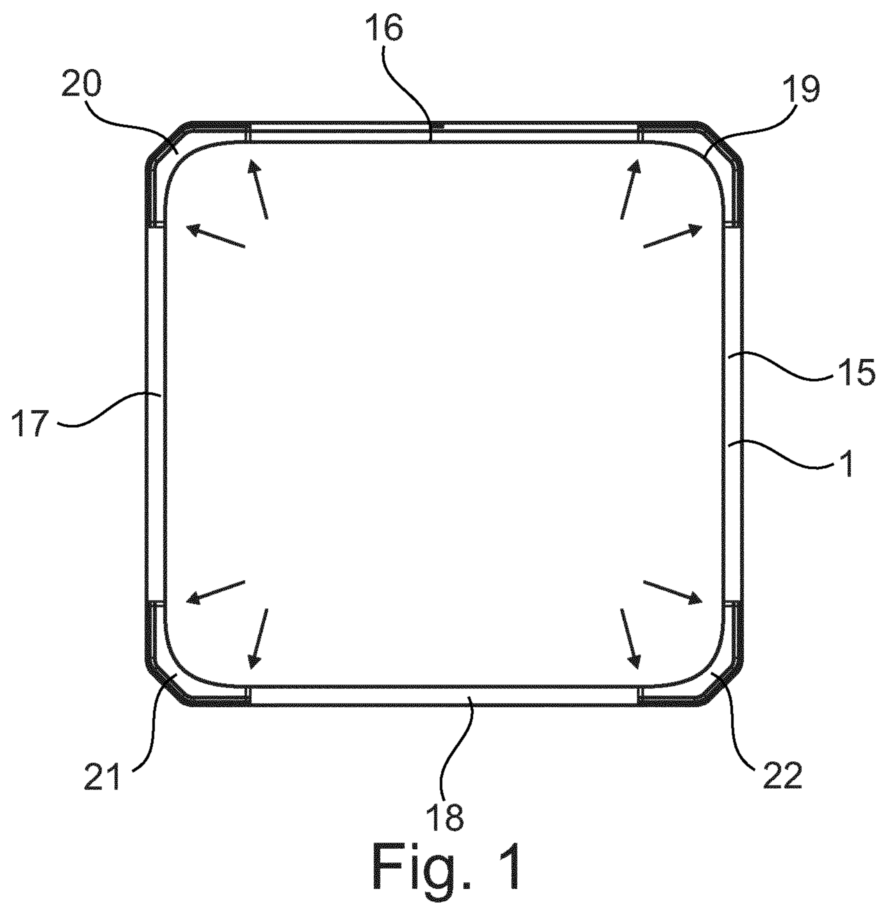
FIG. 1: a side view onto a series of interconnected convolutes that can be used as part of a bellows.
Figure 2:
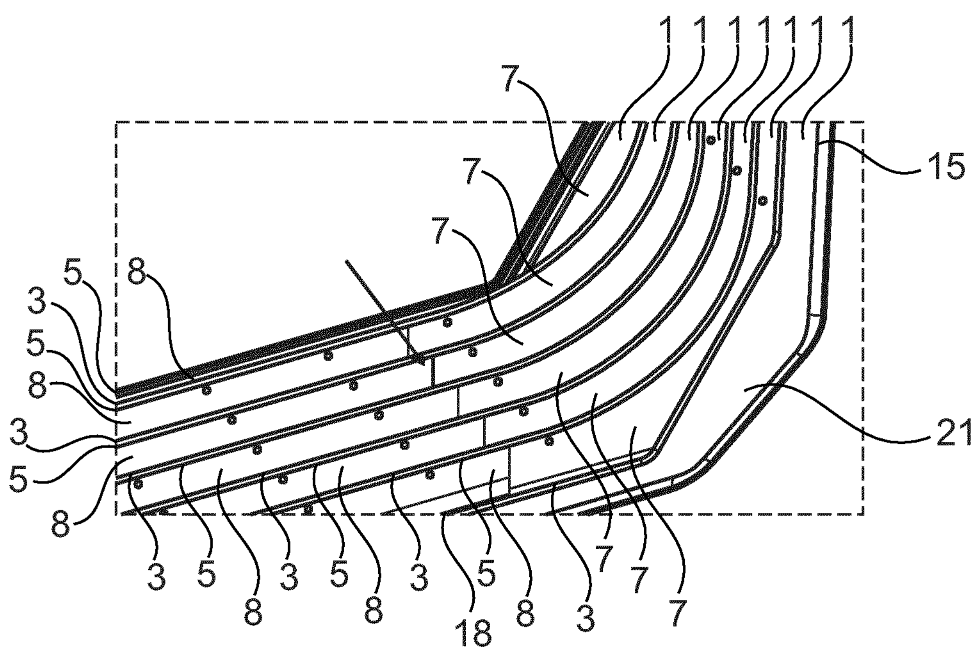
FIG. 2: a schematic perspective view onto a corner of the series of convolutes of FIG. 1.

FIG. 1 shows a side view onto a series of interconnected convolutes 1 that can be used as part of a bellows of a gangway. As highlighted in FIG. 2, a total of seven convolutes 1 has been interconnected to each other. FIG. 2 also highlights that the first convolute 1 and the last convolute what have modified corner shapes.

Figure 4:
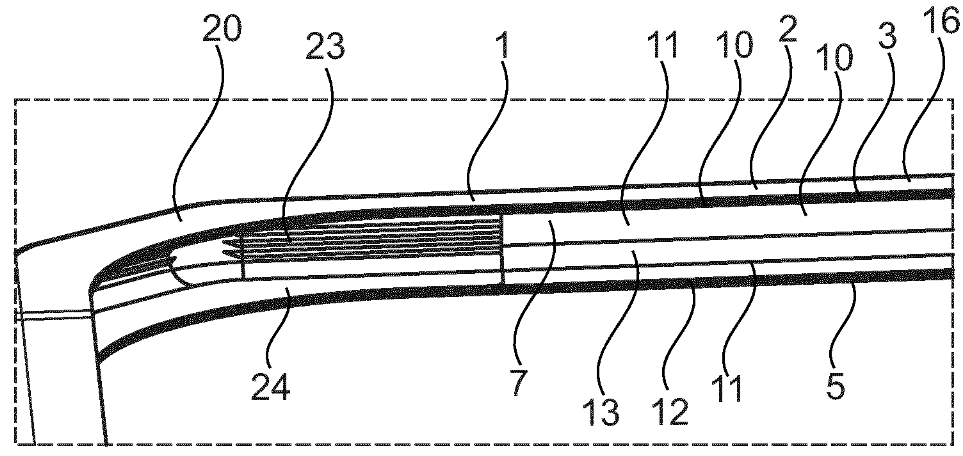
FIG. 4: a perspective view onto a part of a convolute according to the invention

As can be best seen from FIG. 4 that shows an individual convolute 1, the convolute 1 has an outer layer 2 that extends from a first rim 3 via a curved section 4 to a second rim 5. As can be seen from FIGS. 1, 2 and 4, the specific type of convolute 1 shown in the embodiments is of the type that has the curved sections of the convolute pointing outwards and the rims pointing inwards. Hence, the first rim 3 is arranged inwardly of the further parts of the convolute, for example inwardly of the curved section 4 of the convolute. Hence also the second rim is arranged inwardly of further parts of the convolute, for example inwardly of the curved section 4 in the embodiment shown in the Fig. the first rim 3 and the second rim 5 are arranged on the same side relative to the further parts of the convolute, namely inwardly of these further parts.

Figure 3:
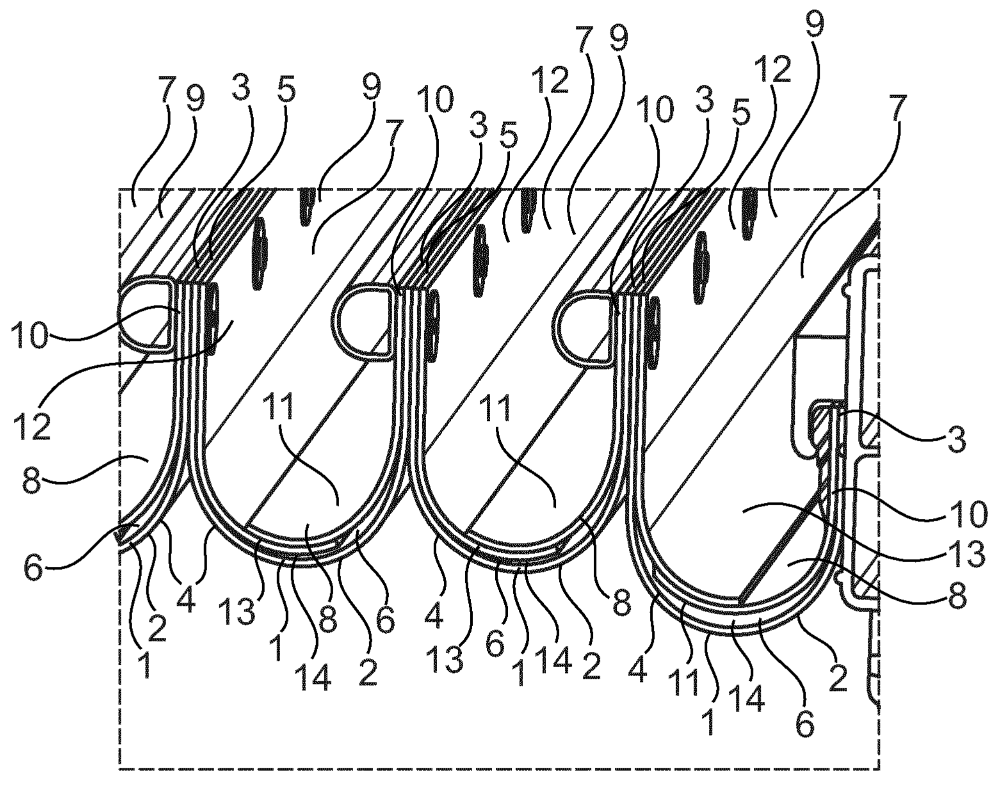
FIG. 3: a perspective view onto a section of the series of convolutes.

As can be best seen in FIG. 3, the outer layer 2 has an inward facing surface 6 that extends from the first rim 3 via the inward facing surface of the curved section 4 up to the second rim 5.

According to the invention, an inner layer set is provided. The inner layer 7 has a first piece 8 and a second piece 9. The first piece 8 has a first end 10 that is attached to the outer layer 2 in the region of the first rim 3 and has a second and 11 that is opposite the first end 10 and that is arranged in the region of the inward facing surface of the curved section 4. The second piece 9 also has a first end 12 that is attached to the outer layer 2 in the region of the second rim 5 and has a second end 13 that is opposite the first end 12 and that is arranged in the region of the inward facing surface of the curved section 4.

As can be best seen from FIG. 3 the second end 11 of the first piece 8 overlaps the second piece 9 in the region of the inward facing surface of the curved section 4. The second end 13 of the second piece 9 overlaps the first piece 8 in the region of the inward facing surface of the curved section 4.

The inward facing surface of the curved section has a crest 14. As can be best seen from FIG. 3 and FIG. 4 the second end 11 of the first piece 8 is an edge of the first piece 8 that extends parallel to the crest. The second end 13 of the second piece 9 is an edge of the second piece 9 that extends parallel to the crest.

The FIG. 1 shows that for the individual convolutes 1 of the series of convolutes are made up more of a longitudinal first side piece 15, a longitudinal top piece 16 in, a longitudinal second side piece 17 and a bottom piece 18. A first corner piece 19 is provided that connects the first side piece 15 to the top piece 16. A second corner piece 20 is provided that connects the top piece 16 with the second side piece 17. A third corner piece 21 is provided that connects the second side piece 17 with the bottom piece 18. A fourth corner piece 22 is provided that connects the bottom piece 18 with the first side piece 15.

As can be best seen in FIGS. 2 and 4, the inner layer 7 is made up of a first inner layer section and a second inner layer section. The first inner layer section is made up of the first piece 8 and the second piece 9. The first piece 8 and the second piece 9 are arranged in the bottom piece 18 (see FIG. 2) or can for example be arranged in the top piece 16 (see FIG. 4). The second inner layer section is made up of a third piece 23 of the inner layer, that is provided in the second corner piece 20, and a fourth piece 24, that is provided in the second corner piece 20. The third piece 23 has a first end that is attached to the outer layer 2 in the region of the first rim of the outer layer. The third piece 23 has a second end that is opposite the first end and that is arranged in the region of the inward facing surface of the curved section in the second corner piece 20. The fourth piece 24 has a first end that is attached to the outer layer 2 in the region of the second rim 5 and has a second end that is opposite the first end and that is arranged in the region of the inward facing surface of the curved section 2 in second corner piece 20. The second end of the third piece 23 overlaps the fourth piece 24 in the region of the inward facing surface of the curved section 2 in the second corner piece. The second end of the fourth piece 24 overlaps the third piece 23 in the region of the inward facing surface of the curved section 2 in the second corner piece 20. In a preferred embodiment, the third piece 23 is not connected to the first piece 8 and the fourth piece 24 is not connected to the second piece 9.

FIG. 5 shows a schematic side view onto a first piece 8 that has cuts 30 that extend from the second end (not shown, situated behind the crest in the view used in FIG. 5) into the material of the first piece 8.

The invention claimed is:

1. A convolute for a bellows for a gangway, the convolute having:

an outer layer that extends from a first rim that is either arranged inwardly of further parts of the convolute or is arranged outwardly from further parts of the convolute, via a curved section, to a second rim, that is either arranged inwardly of further parts of the convolute or is arranged outwardly from further parts of the convolute, but is arranged on the same side relative to these further parts of the convolute than the first rim is, wherein the outer layer has an inward facing surface that extends from the first rim via the inward facing surface of the curved section to the second rim; and an inner layer having a first piece and a second piece, wherein, the first piece has a first end that is attached to the outer layer in a region of the first rim and has a second end that is opposite to the first end and that is arranged in a region of the inward facing surface of the curved section; and the second piece has a first end that is attached to the outer layer in a region of the second rim and has a second end that is opposite to the first end and that is arranged in the region of the inward facing surface of the curved section; and wherein the second end of the first piece overlaps the second piece in the region of the inward facing surface of the curved section, and the second end of the second piece overlaps the first piece in the region of the inward facing surface of the curved section;

wherein the first piece is independent from the second piece and that there is no additional material that is connected to the first piece and to the second piece.

2. A convolute according to claim 1, wherein, the second end of the first piece is independent from the second piece and no additional material is provided that is connected to the second end of the first piece and connected to the second piece; and/or the second end of the second piece is independent from the first piece and no additional material is provided that is connected to the second end of the second piece and connected to the first piece.

3. A convolute according to claim 1, wherein at least one of the first piece and the second piece is unpadded.

4. A convolute according to claim 1, wherein the inward facing surface of the curved section has a crest, and wherein, the second end of the first piece is an edge of the first piece that extends parallel to the crest; and/or the second end of the second piece is an edge of the second piece that extends parallel to the crest.

5. A convolute according to claim 1, wherein at least one of:

a) the first piece has cuts that extend from the second end into the material of the first piece; and b) the second piece has cuts that extend from the second end into the material of the second piece.

6. A convolute according to claim 1, wherein the outer layer and the inner layer are made of different materials.

7. A convolute according to claim 1, wherein the outer layer comprises:

a. a longitudinal first side piece;

b. a longitudinal top piece;

c. a longitudinal second side piece;

d. a first corner piece that connects the first side piece to the top piece;

e. a second corner piece that connects the top piece to the second side piece; and wherein the inner layer is arranged inside the first side piece and/or inside the top piece and/or inside the second side piece and/or inside the first corner piece and/or inside the second corner piece.

8. A convolute according to claim 7, wherein the inner layer is made up of at least a first inner layer section and a second inner layer section, and wherein a. the first piece has a first section that forms part of the first inner layer section;

b. the first piece has a second section that forms part of the second inner layer;

c. the second piece has a first section that forms part of the first inner layer section;

d. the second piece has a second section that forms part of the second inner layer section;

and wherein the first section of the first piece is not connected to the second section of the first piece and/or the first section of the second piece is not connected to the second section of the second piece.

9. A bellows for a gangway comprising:

at least two convolutes connected to one another, each convolute comprising:

an outer layer that extends from a. a first rim that is either arranged inwardly of further parts of the convolute or is arranged outwardly from further parts of the convolute, b. via a curved section, c. to a second rim, that is either arranged inwardly of further parts of the convolute or is arranged outwardly from further parts of the convolute, but is arranged on the same side relative to these further parts of the convolute than the first rim is, wherein the outer layer has an inward facing surface that extends from the first rim via the inward facing surface of the curved section to the second rim; and an inner layer having a first piece and a second piece, wherein d. the first piece has a first end that is attached to the outer layer in a region of the first rim and has a second end that is opposite to the first end and that is arranged in a region of the inward facing surface of the curved section; and e. the second piece has a first end that is attached to the outer layer in a region of the second rim and has a second end that is opposite to the first end and that is arranged in the region of the inward facing surface of the curved section; and wherein the second end of the first piece overlaps the second piece in the region of the inward facing surface of the curved section, and the second end of the second piece overlaps the first piece in the region of the inward facing surface of the curved section;

wherein the first piece is independent from the second piece and that there is no additional material that is connected to the first piece and to the second piece.

10. A bellows according to claim 9, wherein a first convolute of said at least two convolutes is arranged next to the second convolute, and wherein the first rim of the first convolute is connected to the second rim of the second convolute.

11. A bellows according to claim 10, wherein the first end of the first piece of the inner layer of the first convolute is connected to the first rim by the same connection that connects the first rim of the first convolute to the second rim of the second convolute.

12. A bellows according to claim 11, wherein the at least two convolutes comprises three to twenty convolutes, and wherein each convolute is physically connected to a neighboring convolute.

13. A multi-car vehicle having a first car connected to a second car, and a bellows arranged between the first car and the second car, wherein the bellows comprises at least two convolutes connected to one another, each convolute comprising:

an outer layer that extends from a. a first rim that is either arranged inwardly of further parts of the convolute or is arranged outwardly from further parts of the convolute, b. via a curved section, c. to a second rim, that is either arranged inwardly of further parts of the convolute or is arranged outwardly from further parts of the convolute, but is arranged on the same side relative to these further parts of the convolute than the first rim is, wherein the outer layer has an inward facing surface that extends from the first rim via the inward facing surface of the curved section to the second rim; and an inner layer having a first piece and a second piece, wherein d. the first piece has a first end that is attached to the outer layer in a region of the first rim and has a second end that is opposite to the first end and that is arranged in a region of the inward facing surface of the curved section; and e. the second piece has a first end that is attached to the outer layer in the region of the second rim and has a second end that is opposite to the first end and that is arranged in the region of the inward facing surface of the curved section; and wherein the second end of the first piece overlaps the second piece in the region of the inward facing surface of the curved section, and the second end of the second piece overlaps the first piece in the region of the inward facing surface of the curved section; wherein the first piece is independent from the second piece and that there is no additional material that is connected to the first piece and to the second piece.

14. A multi-car vehicle according to claim 13, wherein the at least two convolutes comprises three to twenty convolutes, wherein each convolute is physically connected to a neighboring convolute, and wherein the first rim of one convolute is connected to the second rim of the neighboring convolute.

15. A multi-car vehicle according to claim 14, wherein the first end of the first piece of the inner layer of the one convolute is connected to the first rim by the same connection that connects the first rim of the one convolute to the second rim of the neighboring convolute.

* * * * *